(12) United States Patent
Berstis

(10) Patent No.: US 6,615,239 B1
(45) Date of Patent: Sep. 2, 2003

(54) AUTOMATIC PRESENTATION EXCHANGER

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,327

(22) Filed: Dec. 16, 1998

(51) Int. Cl.[7] .............................................. G06F 15/16
(52) U.S. Cl. ...................... 709/204; 709/205; 709/248; 745/330; 370/260; 370/261
(58) Field of Search ............................... 709/204, 205, 709/200, 231, 248, 280, 298, 331; 345/330; 370/260, 261, 263, 265; 707/201

(56) References Cited

U.S. PATENT DOCUMENTS

| | | | | |
|---|---|---|---|---|
| 5,745,711 A | * | 4/1998 | Kitahara et al. | 345/330 |
| 5,764,916 A | * | 6/1998 | Busey et al. | 709/227 |
| 5,781,190 A | * | 7/1998 | Gorbet et al. | 345/335 |
| 5,781,407 A | * | 7/1998 | Brauel | 361/683 |
| 5,786,921 A | * | 7/1998 | Wang et al. | 359/152 |
| 5,861,968 A | * | 1/1999 | Kerklaan et al. | 359/152 |
| 5,867,653 A | * | 2/1999 | Aras et al. | 709/204 |
| 5,996,003 A | * | 11/1999 | Namikata et al. | 709/205 |
| 6,008,807 A | * | 12/1999 | Bretschneider et al. | 345/339 |
| 6,049,821 A | * | 4/2000 | Theriault et al. | 709/203 |
| 6,088,730 A | * | 7/2000 | Kato et al. | 709/227 |
| 6,104,380 A | * | 8/2000 | Stork et al. | 345/158 |
| 6,108,687 A | * | 8/2000 | Craig | 709/203 |
| 6,141,694 A | * | 10/2000 | Gardner | 709/240 |
| 6,144,991 A | * | 11/2000 | England | 709/205 |
| 6,144,997 A | * | 11/2000 | Lamming et al. | 709/217 |
| 6,209,036 B1 | * | 3/2001 | Aldred et al. | 709/229 |
| 6,230,185 B1 | * | 5/2001 | Salas et al. | 709/205 |
| 6,288,739 B1 | * | 9/2001 | Hales et al. | 348/14.07 |
| 6,411,988 B1 | * | 6/2002 | Tafoya et al. | 709/204 |

* cited by examiner

Primary Examiner—Saleh Najjar
(74) Attorney, Agent, or Firm—Duke W. Yee; Jeffrey S. LaBaw; Stephen J. Walder, Jr.

(57) ABSTRACT

A method of automatically exchanging a presentation among a set of computers. A first presenting computer is positioned relative to at least one receiving computer to facilitate a communication link between the computers. Upon display of a presentation page on the first computer, data representing a given portion of the presentation page is repeatedly broadcast over the communication link. At the receiving computer, the data is received and displayed, and stored for later use. Preferably, the broadcast medium is an infrared communications channel. The data representing the given portion of the presentation page is broadcast in packets, with each packet having a checksum associated therewith. The receiving computer uses the checksum to verify the integrity of the data packet. If data packet integrity is in question, a message is output to the user indicating that the receiving computer should be repositioned relative to the transmitting computer.

18 Claims, 4 Drawing Sheets

AUTOMATIC PRESENTATION EXCHANGER

BACKGROUND OF THE INVENTION

1. Technical Field

This invention relates generally to techniques for automatically sharing data among computers during a presentation or meeting.

2. Description of the Related Art

Business meetings are frequently led by a speaker who shares information in a visual on-line presentation. Typically, the presentation is created on a computer using a software program (e.g., Freelance™ or PowerPoint™) that enables the author to create presentation pages (analogous to overhead "slides") that are displayed at the meeting using a projector. The projector is driven by a computer. The presentation pages may include text and images, and such programs typically enable the author to create special text effects to present the information in a compelling and interesting manner. On occasion, the presenter distributes copies of his or her on-line presentation. More often than not, however, meeting attendees or participants are forced to copy manually what information that they can as the on-line presentation proceeds. Thus, instead of focusing on the speaker and the presentation, the attendees often expend significant effort attempting to record information from the on-line slides. This is frustrating to the attendees and is often counter-productive, as many such meetings are for the purpose of education or information sharing.

Thus, unless the presenter distributes or otherwise makes available a copy of an on-line presentation, participants have no simple way of obtaining a useful copy of such information.

The present invention addresses this problem.

BRIEF SUMMARY OF THE INVENTION

It is an object of the present invention to provide a participant in a meeting with a copy of an on-line presentation, as a meeting is taking place, by automatically transmitting presentation data to the participant's computer.

It is another object of this invention to provide a mechanism by which a computer may broadcast presentation data to other computers being used by participants in a meeting.

Another object of the present invention is to broadcast information over a communication link between a first computer and a set of one or more computers that are operating in the same local vicinity as the first computer.

A more specific object of this invention is to establish and maintain a data communications link between a transmitting computer and a set of one or more receiving computers that are operating in the same area so that presentation data may be recorded by the receiving computers in a background task.

Still another object of this invention is to provide a mechanism that enables a meeting presenter to provide meeting participants with copies of a presentation automatically during the meeting.

A more general object of this invention is to improve workplace productivity and to reduce the time and effort required to obtain and transcribe meeting notes.

Still another general object of this invention is to eliminate the need for a standalone projector or screen display during a meeting at which an on-line presentation is being made.

Yet another object of this invention is to use wireless communication links (e.g., IR, RF, ultrasound, etc.) between a presenting computer and a set of one or more receiving computers. Alternatively, the inventive protocol may be implemented with a wired solution.

These and other objects are provided in a method of automatically exchanging a presentation among a set of computers. In particular, a first presenting computer is positioned relative to at least one receiving computer to facilitate a communication link between the computers. Upon display of a presentation page on the first computer, data representing a given portion of the presentation page is repeatedly broadcast over the communication link. At the receiving computer, the data is received and displayed, and stored for later use.

Preferably, the broadcast medium is an infrared communications channel. The data representing the given portion of the presentation page preferably is broadcast in packets, with each packet having a checksum associated therewith. The receiving computer uses the checksum to verify the integrity of the data packet. If data packet integrity is in question, a message is output to the user indicating that the receiving computer should be repositioned relative to the transmitting computer. For example, the message is output via a pop-up window or an audible signal.

In the preferred embodiment, the presentation page data is stored in a given format, for example, using hypertext markup language (HTML). This format is convenient as it enables the user to view the page data using a conventional Web browser.

Thus, according to the present invention, known presentation software programs are modified or augmented to automatically broadcast to other computers in a meeting room, a test, and possibly a more detailed version of one or more display pages, being discussed during a presentation. Receiving computers that are configured with the corresponding receiving software capture this information and display it on the receiving computer and, preferably, save it to disk. Further, any correction and/or notes applicable to the presentation can be dynamically shared and saved by the participants.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
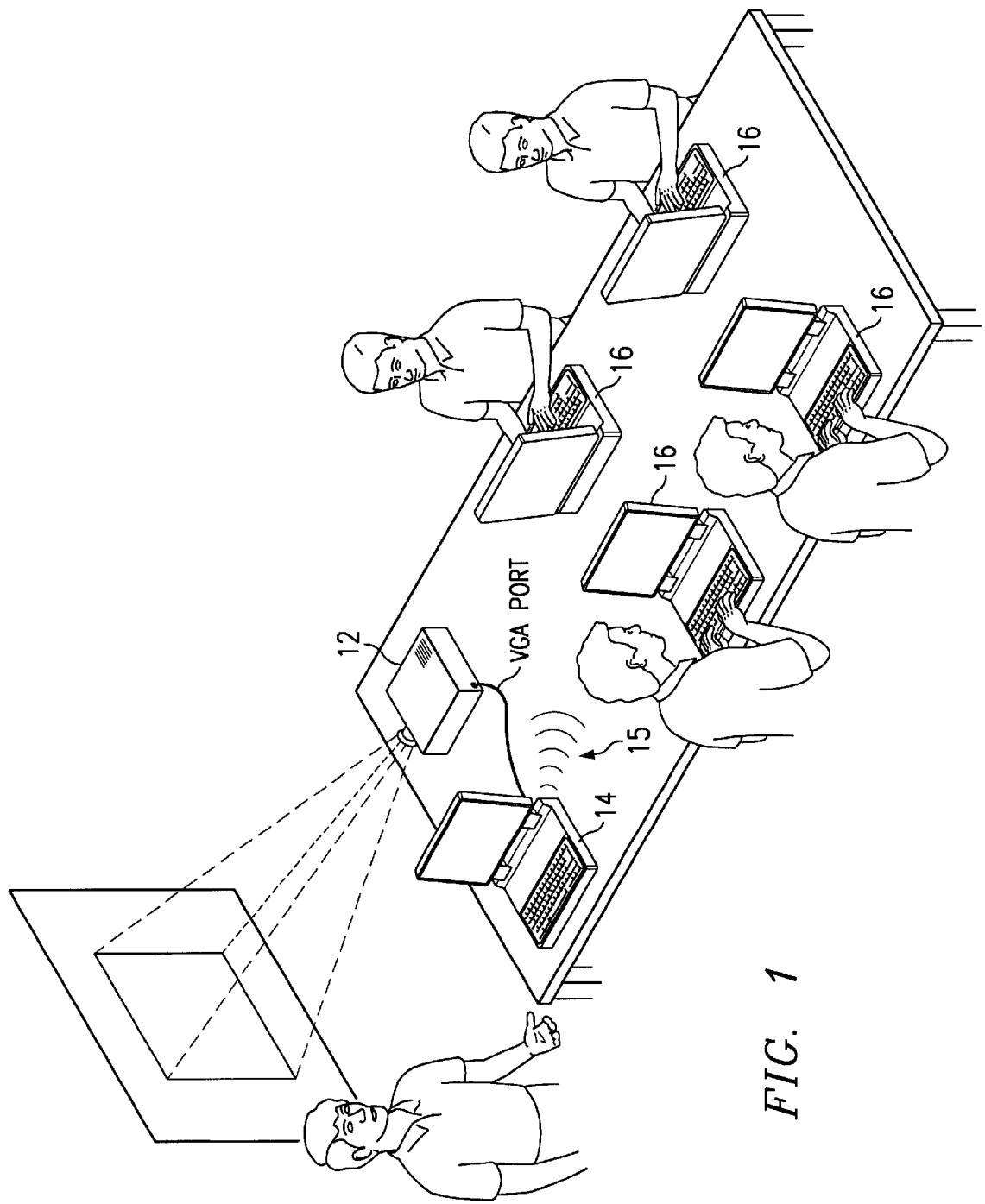
FIG. 1 illustrates a meeting room in which the present invention is implemented.

FIG. 1 illustrates a meeting room. Display projector 12 is normally driven by a computer 14, which according to the invention stores a presentation that is to be shared automatically with a number of other participants in the meeting. Computer 14 has a conventional VGA video signal output that drives projector 12 to display a page on a screen or a blank wall. This operation is conventional. One or more of the participants at the meeting have their own computer 16. According to the invention, the presenter's computer 14 (sometimes referred to herein as a "presenting" or sending computer) interacts with the participant computers 16 (each sometimes referred to herein as a "receiving" computer) over a communications link 15 to automatically transmit the leader's presentation so that a copy of the presentation (or portions thereof) is provided to the participants. In this way, participants are freed from having to take detailed notes of the presentation pages and/or to attempt to obtain copies of the presentation.

Figure 2:
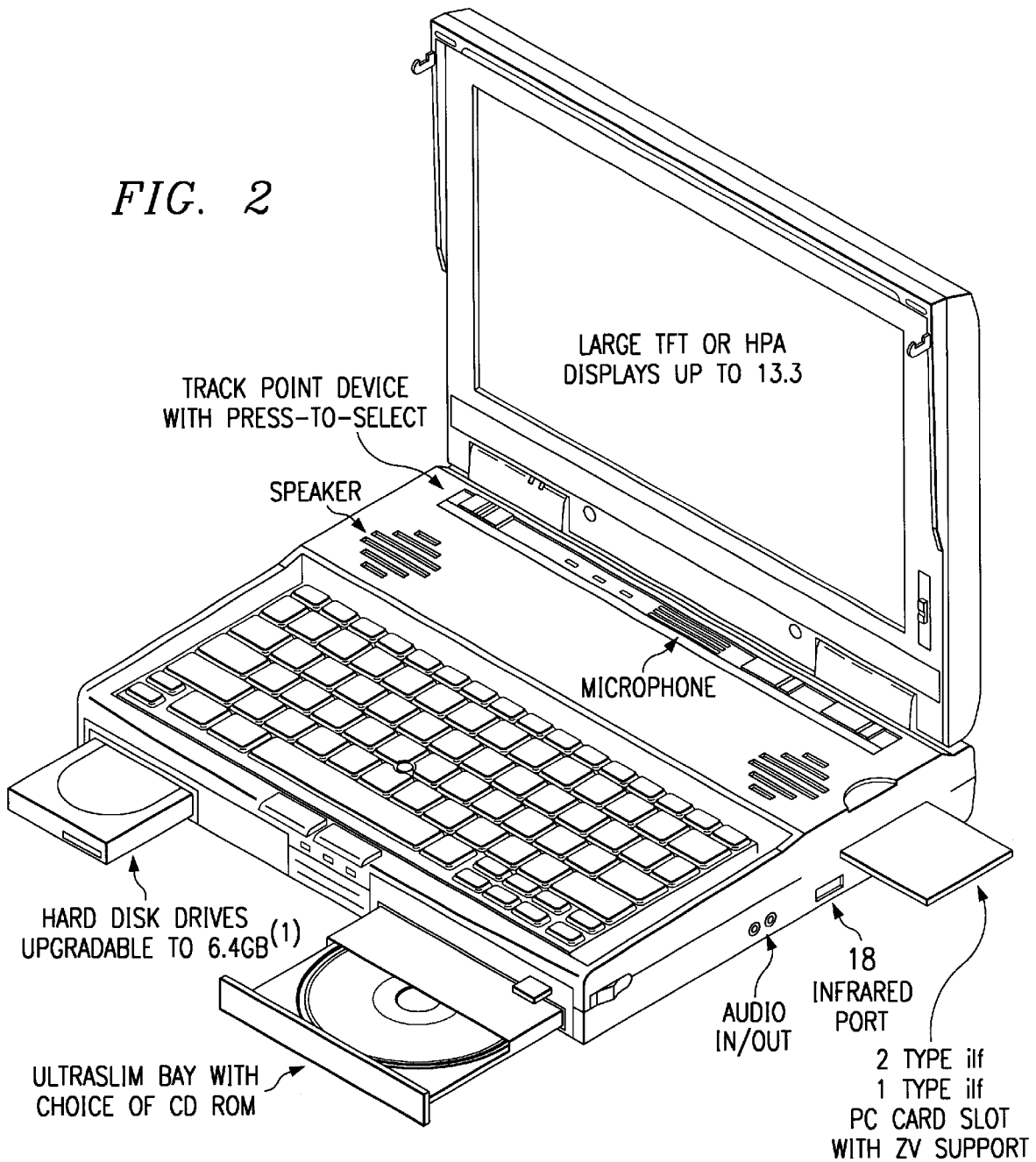
FIG. 2 is a perspective view of a representation notebook computer used in the present invention.

In an illustrative embodiment, each computer is a notebook or "laptop" computer such as any model in the IBM ThinkPad™ family of personal computers. Of course, the particular type and model of computer is not a limitation of the present invention. As seen in FIG. 2, each computer is provisioned with suitable input/output devices to facilitate the automatic presentation exchange. In this embodiment, a given computer has at least one set of preferably high speed infrared (IR) ports 18 mounted on the computer housing. The ports are located in convenient locations around the computer's housing to transmit or receive signaling as required. Alternatively, an IR port set may be implemented in a card bus device (e.g., a PCMCIA card). For example, one set of IR ports is located in the front of the housing while a second set is located in the back. Of course, a set of ports may be located on each of the front, back and side portions of the housing. The particular location of the port set is not a limitation of the instant invention. A given port set comprises a light emitting diode for transmitting IR signals, and a photodiode for receiving transmitted IR signals.

In operation, a given receiving computer's IR port set is positioned relative to a presenting computer's IR port set so that infrared signals issued from the presenting computer may be received at the receiving computer. When a given receiving computer is positioned in this manner, a communication link between the computers is available for transmission of broadcast signals representing the presentation data.

As will be seen, the presenting computer has a software program (namely, a set of instructions executable in a processor) that effects the broadcast of the presentation data, and each receiving computer has a software program that receives, controls the display of, and stores the presentation data in a given format. Each program may be a standalone piece of software, or the two programs may comprise parts of a single program that exhibits the functionality. Thus, a given computer provisioned with the program and the IR port set may operate as either a presenting computer or a receiving computer.

Figure 3:
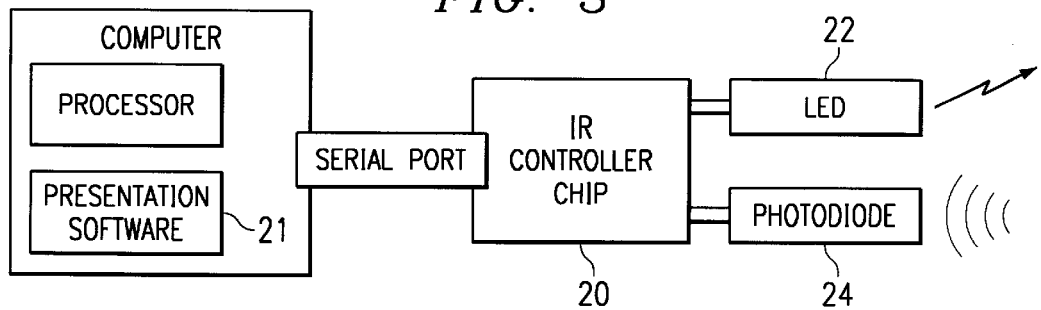
FIG. 3 is a simplified block diagram of the components of the notebook computer that are used to facilitate the automatic presentation exchange.

Referring now to FIG. 3, a laptop computer configured according to the present invention includes an IR controller chip 20 that drives a light emitting diode (LED) 22 and photodiode 24 comprising the IR port set 18. As noted above, the LED 22 emits IR signals and the photodiode 24 receives IR signals. Thus, when the computer is configured as a presenting or sending computer, information about the presentation is broadcast using the LED 22 of the IR port set. When the computer is configured as a receiving computer, the photodiode 24 is used to receive the information broadcast from the sending computer. In particular, the IR controller chip 20 (in a sending computer) receives information signals from the computer processor and uses these signals to modulate the infrared signal output by the LED. Conversely, at a receiving computer, IR signals (modulated with information) and received by the photodiode are processed by the IR controller chip 20 to obtain the information. A representative IR controller chip is an IBM Model 31T1502, which is used with a transceiver module such as a Model IBM 31T1101.

Thus, according to one embodiment of the invention, the presenting computer 14 broadcasts the presentation (or portions thereof) using the LED of its port set. Computers 16 receive the presentation using the photodiode of their port set. A given computer, therefore, may function as either a sending or receiving computer. As seen in FIG. 1, the presenter's notebook computer is positioned on the table with its IR port set 18 positioned to broadcast the presentation signals in a manner that will facilitate their being received by the receiving computers 16.

Figure 4:
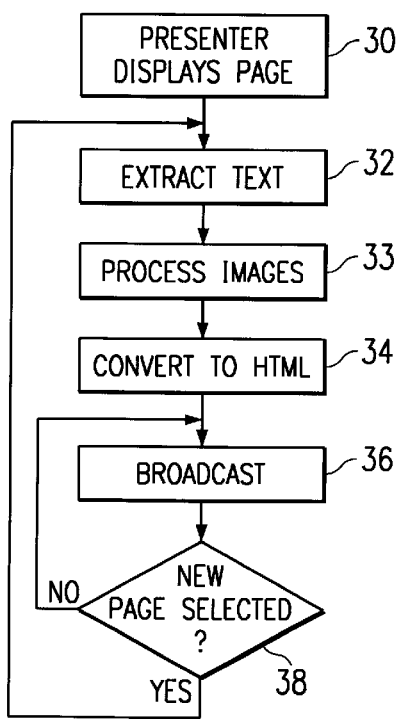
FIG. 4 is a flowchart of the computer program running on the presenting computer.

The presenting computer 14 executes a presentation program (such as Freelance or PowerPoint) 21 that is enabled or augmented to provide the functionality of the present invention. Alternatively, the functionality is provided by a standalone program. In either case, the operation is described in the flowchart of FIG. 4. The routine runs as a background task to the presentation program. The logic begins at step 30 when the presenter displays a page from the presentation. As noted above, when the presentation page is displayed, a VGA video signal is output to the projector, which displays the page on the screen or wall. (If all participant computers operate as receiving computers, the projector is not required, of course). At step 32, the inventive routine extracts text from the page, preferably ignoring background colors, decorations, borders, and the like that comprise the remainder of the slide. If the presentation page includes images, these images are processed in step 33. In particular, during this step a image is reduced in resolution or optionally eliminated as determined by a properties setting determined, for example, by the presentation author). Another purpose is to reduce the amount of data transmitted over the link. At step 34, the presentation text and any processed images are converted to a markup language format (e.g., HTML). HTML is a convenient format because receiving computers normally include a Web browser that may be used to display the received presentation data as an HTML page. Referring back to the flowchart, the routine then continues at step 36 with the routine in the presenting computer broadcasting the text and specified pictures via the LED of its IR port set to other computers in the room. At step 38, a test is made to determine whether a new presentation page has been selected for display. If the outcome of the test at step 38 is negative, the routine returns to step 36 to repeat the broadcast of the current page data. If, however, the outcome of the test at step 38 is positive, the routine returns to step 32 and processes the newly-displayed page in the manner already described.

Thus, according to the invention, presentation data from an on-line presentation page is broadcast to each of the receiving computers. A preferred transmission protocol for this broadcast is now described. The transmission preferably starts with a pause period with no transmission. Then, a small amount of data is broadcast identifying that what follows is a presentation broadcast. The following is representative:

---
1 String of 0101 data (to enable the automatic gain control (if any) of the receiving computer's IR controller chip to stabilize);
2 Fixed 4 byte string "PRES";
3 Size of this data packet;
4 4 bytes representing the total amount of data;
5 The number of packets into which the data is split;
6 Title + Author + any other identifying string of data; and
7 4 byte checksum for this packet
---

Thereafter, the packets of data (each preferably 256 bytes maximum) with the content of the data transmission are then broadcast as follows:

---
1 Fixed 4 byte String "PRDT";
2 Size of this data packet;
3 Packet number - 4 bytes;
4 Text of presentation (Pictures are delimited with tags such as <Image=JPG length =nnn>xxxxximagedataxxxxx</Image>; and
5 4 byte Checksum for this packet.
---

Each receiver computer having an IR port with a photodiode may receive the above data from the presenting computer if the IR port set is positioned appropriately.

Figure 5:
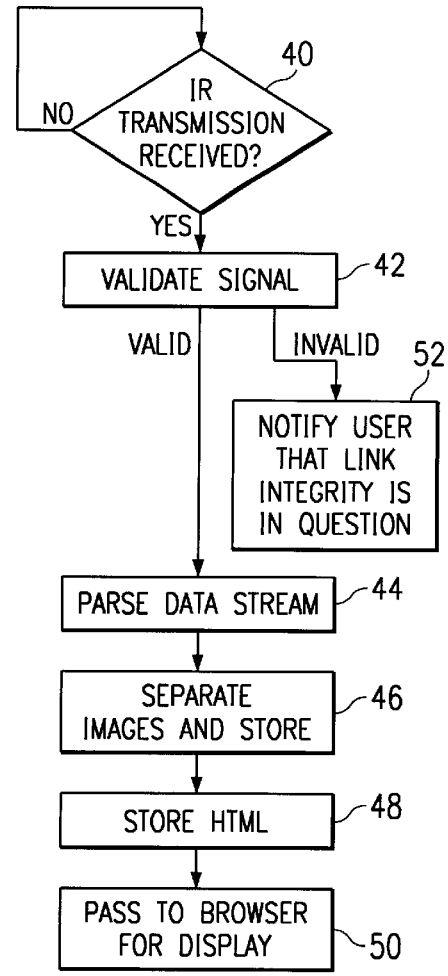
FIG. 5 is a flowchart of the computer program running on a receiving computer.

FIG. 5 illustrates a flowchart of the preferred operation of the software program operating on a receiving computer 16. Preferably, this routine operates as a background process. The routine begins at step 40 to test for IR transmissions. If the outcome of the test at step 40 is negative, the routine cycles and waits for input signaling. When an IR transmission is received and processed by the IR controller chip, the resulting signal is validated at step 42. In particular, each data packet is applied to a checksum routine to determine if the data matches the checksum appended to the packet. If the outcome of the test at step 42 indicates that data packets are valid, the routine continues at step 44 to parse the data stream. At step 46, the images (if any) are separated out and placed into separate files with randomly assigned unique names. In this step, the HTML image tag pair (for each image) is replaced with a tag to the newly-created file in the HTML document so that the image data is no longer in-line in the HTML document. At step 48, the resulting HTML is stored in a randomly assigned uniquely named file. At step 50, this file is passed to the receiving computer's Web browser and thus displayed using local browser resources.

Thus, in the illustrative embodiment, image data is optionally removed from the page before it is displayed on the receiving computer. (This processing is not required, of course). This processing ensures that the meeting participants receive at least the text information on their display screens as the presentation is being given. Later, however, when the user reviews the stored presentation, the image data may be added back into the presentation to provide a more complete version of the original presentation. Moreover, by storing each presentation page in its own file, the recipient of such information may annotate the file and then readily save the annotated file.

Returning back to the flowchart, if the outcome of the test at step 42 indicates that data packets are not valid (because, for example, there is an interruption in the received signal, there is a failure to match the checksum, or any other such reason), the routine branches to step 52 to notify the user that link integrity is in question. Thus, for example, receiving computer displays a pop-up window with a message indicating that the computer is having difficulty in receiving the signal. The particular message depends on the type of problem being experienced. Thus, for example, one illustrative message may simply provide a suggestion for pointing the computer's IR ports more directly at the sending computer. The routine may also provide the user with a visual signal, such as a small bar graph, indicating the IR signal strength as the user's positions the computer relative to the sending computer.

As can be seen, each receiving computer that maintains a communication link with the sending computer displays and stores given data representing the presentation. Preferably, the data is stored and displayed using an HTML format so that the receiving computer's Web browser may be used to display the information. Alternatively, the data is stored in a format of the presentation program (e.g., a .ppt file extension for PowerPoint).

Figure 6:
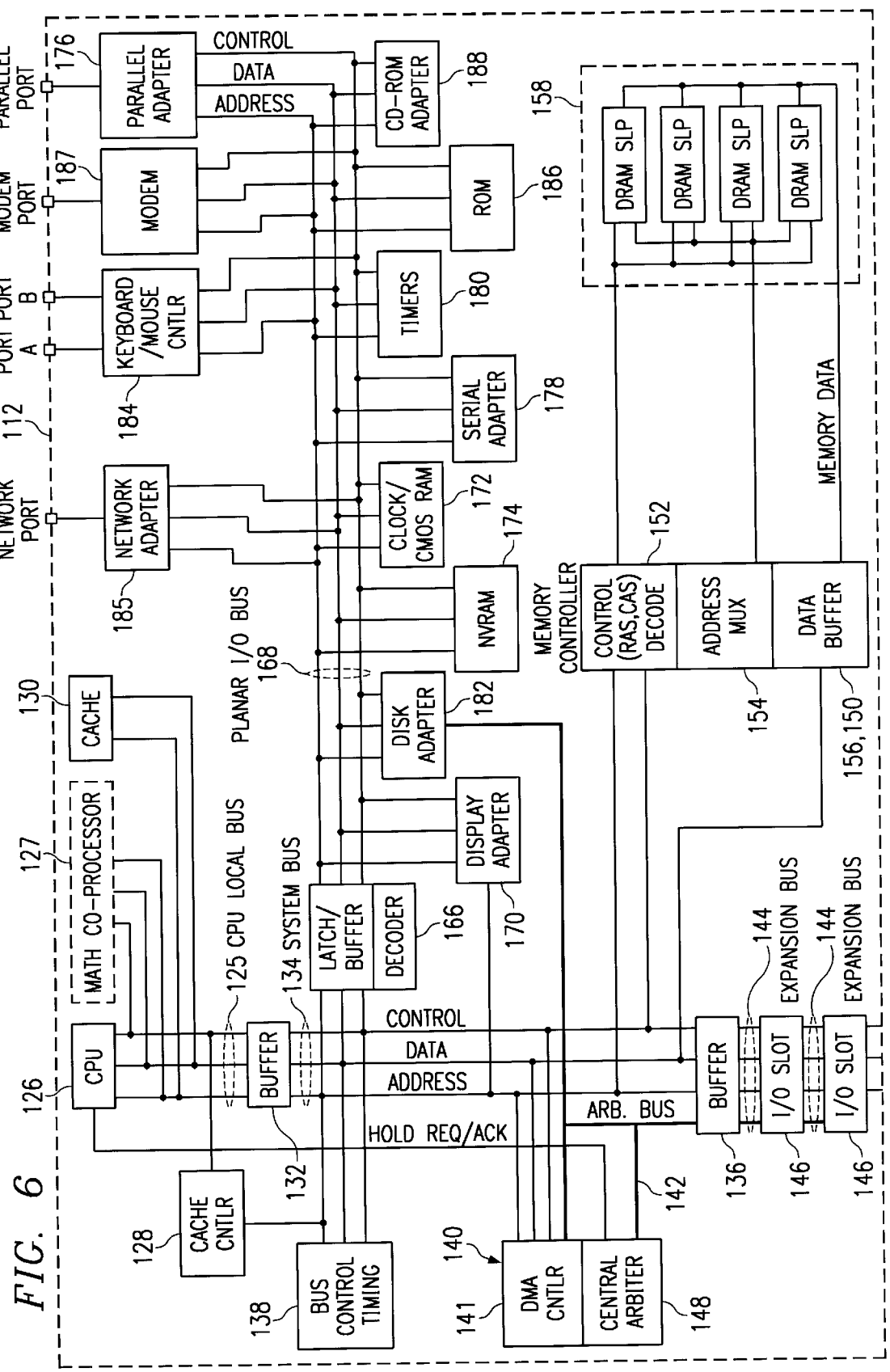
FIG. 6 depicts a block diagram of a representative notebook computer for use as either the presenting or receiving computer.

Referring now to FIG. 6, there is depicted a block diagram of the principal components of a sending or receiving computer. The IR controller preferably communicates with the computer through the serial adapter 178. As illustrated, the computer includes a central processing unit (CPU) 126 which executes software instructions. While any appropriate microprocessor can be utilized for CPU 126, CPU 126 is preferably one of the PowerPC™ line of microprocessors available from IBM Microelectronics. Alternatively, CPU 126 can be implemented as one of the x86-type microprocessors, which are available from a number of vendors such as Intel. In addition to CPU 126, an optional math coprocessor 127, cache controller 128, and cache memory 130 are coupled to high-speed CPU local bus 125. Math coprocessor 127 is an optional processor, distinct from CPU 126, that performs mathematic computations with greater efficiency than CPU 126. Math coprocessor 127 is optional since the performance advantage provided by a math coprocessor may be achieved by enhancements to CPU 126, such as the implementation of multiple floating-point execution units. Cache memory 130 comprises a small high-speed memory which stores frequently accessed data and instructions. The operation of cache 130 is controlled my cache controller 128, which maintains a directory of the contents of cache 130 and enforces a selected cache coherency protocol.

CPU local bus 125 is coupled to buffer 132 to provide communication between CPU local bus 125 and system bus 134, which extends between buffer 132 and a further buffer 136. System bus 134 is connected to bus control and timing unit 138 and direct memory access (DMA) unit 140, comprising central arbiter 148 and DMA controller 141. DMA controller 141 supports memory accesses that do not involve CPU 126. Direct memory accesses are typically employed to transfer data directly between RAM 158 and an "intelligent" peripheral device, such as disk adapter 182. DMA requests from multiple peripheral devices are arbitrated by central arbiter 148. As described below, central arbiter 148 also regulates access to devices coupled to expansion bus 144 by control signals transmitted via arbitration control bus 142.

CPU 126 accesses data and instructions from and stores data to volatile random access memory (RAM) 158 through memory controller 150, which comprises memory control unit 150, address multiplexer 154, and data buffer 156. RAM 158 includes an error message handler 159 that provides the inventive functionality of the present invention described below. Memory control unit 152 generates read enable and write enable signals to facilitate storage and retrieval of data and includes address translation facilities that map virtual addresses utilized by CPU 126 into physical addresses within RAM 158. RAM 158 comprises a number of individual volatile memory modules which store segments of operating system and application software while power is supplied to the computer. The software segments are partitioned into one or more virtual memory pages which each contain a uniform number of virtual memory addresses. When the execution of software requires more pages of virtual memory that can be stored within RAM 158, pages that are not currently needed are swapped with the required pages, which are stored within nonvolatile storage devices 122–124. Memory controller 150 further includes address multiplexer 154, which selects particular addresses within RAM 158, and data buffer 156, which buffers data read from and stored to RAM 158. Memory controller 150 also provides memory protection that isolates system processes and user processes within the virtual address space allocated to each process.

Still referring to FIG. 5, buffer 136 provides an interface between system bus 134 and expansion bus 144. Connected to expansion bus 144 are a number of I/O slots 146 for receiving adapter cards which may be further connected to an I/O device or memory. Arbitration control bus 142 couples DMA controller 141 and central arbiter 148 to I/O slots 146 and disk adapter 182. By implementing a bus arbitration protocol, central arbiter 148 regulates access to expansion bus 144 by extension cards, controllers, and CPU 126. In addition, central arbiter 148 arbitrates for ownership of expansion bus 144 among the bus masters coupled to expansion bus 144. Bus master support allows multiprocessor configurations of expansion bus 144 to be created by the addition of bus master adapters containing a processor and its support chips.

System bus 134 is coupled to planar I/O bus 168 through buffer 166. Attached to planar I/O bus 168 are a variety of I/O adapters and other peripheral components, including display adapter 170, disk adapter 182, nonvolatile RAM 174, clock 172, serial adapter 178, timers 180, read only memory (ROM) 186, CD-ROM adapter 188, keyboard/mouse controller 184, network adapter 185, modem 187, and parallel adapter 176. Display adapter 170 translates graphics data from CPU 126 into R G, and B video signals utilized to drive display device 114. Depending upon the operating system and application software running, the visual output may include text, graphics, animation, and multimedia video. Disk adapter 182 controls the storage of data to and the retrieval of data from hard disk drive 124 and diskette drive 122. Disk adapter 182 handles tasks such as positioning the read/write heads within drives 122 and 123 and mediating between drives 122 and 123 and CPU 126. Nonvolatile RAM 114 stores system configuration data that describes the present configuration of the computer.

Clock 172 is utilized by application programs executed by CPU 126 for time of day calculations. Serial adapter 178 provides a synchronous or a synchronous serial interface which enables the computer to communicate with a remote data processing system or peripheral device. It also connects to the IR controller as previously described. Serial communication is governed by a serial communication protocol such as RS-232, RS-422, or the like. Timers 180 comprise multiple interval timers which may be utilized by application or operating system software to time one or more selected events within the computer.

ROM 186 typically stores a basic input/output system (BIOS) which provides user-transparent I/O when CPU 126 is operating under the DOS operating system. BIOS also includes power on self-test (POST) diagnostic routines which perform system set up at power on. CD-ROM adapter 188 interfaces CD-ROM drive 124 with planar I/O bus 134 to support retrieval of data from an optical disk loaded within CD-ROM drive 124. Keyboard/mouse controller 184 interfaces keyboard 116 and a graphical pointing device such as a trackpad or mouse 118.

Finally, the computer includes network adapter 185, modem 187, and parallel adapter 176, which facilitate communication between the computer and peripheral devices or other data processing systems. Network adapter 185 is utilized to connect the computer to an unillustrated local area network (LAN) or other computer network such as the Internet, an intranet or the like. Modem 187 supports communication between the computer and another data processing system over a standard telephone line. Parallel port 176 transmits printer control signals and output data to a printer through a parallel port. At start up, a "bootstrap" or primary operating system loader is run to load segments of an operating system (OS) (not shown) into RAM 158 and launch execution of the operating system.

The present invention is quite advantageous. As is readily apparent, the invention method and mechanism provides a simple and efficient technique for providing each participating user a copy of the on-line presentation so the users do not have to spend time copying down the presentation. The presentation data (or at least some portion thereof) is preferably displayed in realtime (using a Web browser, for example) as the presentation proceeds. Information representing a presentation page is stored in a file that may be annotated by the user of the receiving computer. Moreover, one of ordinary skill will appreciate that if all participants in the meeting have computers configured as receiving computers, there is no need for an expensive projector and a wall or screen on which to display the on-line presentation.

While use of an IR broadcast protocol is preferred, one of ordinary skill will appreciate that other communications techniques may be used. Thus, for example, if the computers do not support a broadcast protocol, then a slower data rate protocol can be constructed on top of a higher bi-directional protocol based on any kind of differentiation possible that would let the data rate protocol convey one and zero bits. For example, a communication may be initiated in one of two ways that causes one of two error responses at the receiver. This may be needed if all of the receiving computers try to simultaneously carry on a two way conversation with the sending computer's IR system.

Another communication protocol alternative is to have each receiving computer assigned a time slice window for communication. An initial communication attempt (with possible failure) is then used to synchronize all of the receiving computer clocks. Thereafter, each receiving computer is assigned a one second (or other amount) time window for communicating with the sending computer in a round-robin manner. Preferably, this protocol is set up manually by having the presenter type in the number of receiving computers and having each receiver enter (e.g., by typing) in a unique number from 1 to N, where N is the number of receiving computers. Each of the receiving computers disables its IR port during all but its own time window. An automatic assignment is also possible where the receiving computers establish connections via a protocol that uses random numbers to set a time for the initial communication (with the hope of not interfering with a neighbor) until each has successfully been assigned a unique number by the presenting computer.

Of course, if desired, each of the receiving computers may be hardwired to the presenting computer, for example, over a Token Ring or Ethernet connection to facilitate the transmission of the presentation data. Thus, the computers may be connected over a local area network, a wide area network, over an intranet or even the Internet. The Internet or intranet connection is quite useful because, as noted above, the inventive routine preferably transmit and store the presentation pages as HTML (or any other convenient markup language such as SGML, XML, or the like). When physical connections are used in this manner, one or more of the computers may not be located in the same physical location. The inventive sharing of on-line presentation data thus may be implemented over a wireless or wired communication channel or link according to the present invention. The channel may support half duplex or full duplex communications. Further, a first receiving computer may connect to the presenting computer over one type of link (e.g., IR) while a second computer connects to the presenting computer over another type of link (e.g., a wired connection).

As previously discussed, the above-described functionality preferably is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Having thus described my invention, what I claim as new and desire to secure by letters patent is set forth in the following claims:

What is claimed is:

1. A method of automatically exchanging a presentation among a set of computers, comprising the steps of:

positioning a first computer and at least one receiving computer to establish a communication channel;

upon display of a presentation page on a first computer, broadcasting data representing a given portion of the presentation page over the communication channel;

at a receiving computer, receiving and storing the data for subsequent use wherein, at the receiving computer, the data is parsed to separate text data from image data.

2. The method as described in claim 1 wherein the communication channel is an infrared (IR) link.

3. The method as described in claim 1 wherein the data is broadcast in packets using a given protocol and wherein each packet has a checksum associated therewith.

4. The method as described in claim 3 further including the step of, at a receiving computer, verifying the checksum of a given packet.

5. A method of automatically exchanging a presentation among a set of computers, comprising the steps of:

positioning a first computer and at least one receiving computer to establish a communication channel;

upon display of a presentation page on a first computer, broadcasting data representing a given portion of the presentation page over the communication channel, wherein the data is broadcast in packets, and wherein each packet has a checksum associated therewith;

at a receiving computer, verifying the checksum of a given packet; and at the receiving computer, prompting a use to reposition the receiving computer relative to the first computer if the checksum of a given packet cannot be verified.

6. The method as described in claim 1 wherein the data is broadcast as an HTML page.

7. The method as described in claim 6 further including the step of displaying the data at the receiving computer.

8. The method as described in claim 7 wherein the data is displayed at the receiving computer as an HTML page.

9. A method of automatically exchanging a presentation among a set of computers, comprising the steps of:

positioning a first computer and a set of receiving computers so that signals broadcast by the first computer are receivable by the set of receiving computers;

upon display of each presentation page on the first computer, broadcasting to the receiving computers an HTML stream representing information derived from the presentation page; and at each receiving computer, receiving and storing the HTML stream.

10. The method as described in claim 9 wherein, at each receiving computer, the HTML stream is displayed using a browser.

11. A method of automatically exchanging a presentation among a set of computers, comprising the steps of:

positioning a first computer and a set of receiving computers so that signals broadcast by the first computer are receivable by the set of receiving computers;

upon display of each presentation page on the first computer, broadcasting to the receiving computers an HTML stream representing information derived from the presentation page; and at each receiving computer, receiving and storing the HTML stream, wherein, at each receiving computer, the HTML stream is parsed to separate text data from image data, and wherein the image data is stored separately from the text data.

12. A computer, comprising:

a processor;

an IR controller chip;

an IR port set controlled by the IR controller chip and comprising a photodiode for receiving and decoding information bearing IR signals to generate a presentation page being broadcast by another computer; and a presentation exchange program operable by the processor for receiving and storing the presentation page, wherein the presentation exchange program includes:

means for parsing the presentation page and identifying text, and at least one image element; and means for storing the text in a first file together with a pointer to a second file in which the image element is stored.

13. The computer as described in claim 12 further including a browser for displaying the first file.

14. A method of automatically exchanging a presentation among a set of computers, comprising the steps of:

receiving a broadcast of a presentation page, currently being displayed by a first computer, in a second computer, wherein the broadcast includes text data of the presentation page and image data of the presentation page; and storing the text data of the presentation page separately from the image data of the presentation page in the second computer.

15. The method of claim 14, further comprising:

at a later time, retrieving the text data and the image data; and displaying a composite of the text data and image data on the second computer to thereby recreate the presentation page.

16. The method of claim 14, further comprising:

upon receipt of the broadcast of the presentation page, displaying on the second computer only the text data of the presentation page.

17. The method of claim 14, wherein the text data is stored as a first file in the second computer and the image data is stored as a second file in the second computer, and wherein the first file includes a pointer to the second file.

18. The method of claim 15, wherein the composite of the text data and the image data is displayed using a web browser resident on the second computer.

* * * * *